Jan. 1, 1963 H. HILTEBRAND 3,071,027
METHOD FOR MANUFACTURING CIRCULAR SAWS
Filed Nov. 28, 1960

United States Patent Office 3,071,027
Patented Jan. 1, 1963

3,071,027
METHOD FOR MANUFACTURING
CIRCULAR SAWS
Heinrich Hiltebrand, Bassersdorf, Zurich, Switzerland, assignor to Lennartz & Co., Bulach, Zurich, Switzerland
Filed Nov. 28, 1960, Ser. No. 71,977
Claims priority, application Switzerland Mar. 27, 1957
5 Claims. (Cl. 76—112)

This application is a continuation-in-part of application Serial No. 724,073, filed March 26, 1958, now abandoned.

The present invention relates to circular saws and more particularly to a circular saw of the type having a saw blade and saw teeth inserted into circular recesses provided along the periphery of the blade.

It is an object of the invention to provide a novel circular saw and an improved method of manufacturing circular saws of the kind referred to.

According to the invention the method comprises boring equidistantly spaced circular holes into the marginal portion of a saw blade blank of larger diameter than the finished saw blade, reducing the diameter of said blank to that of the finished blade by a cutting operation performed along the periphery of the blank whereby said holes are transformed into recesses which are open on the periphery of the saw blade, cutting off a portion from the cylindrical contour of each insert member to form a portion of reduced diameter, inserting each insert member in radial direction into an open recess formed on the saw blade, rotating the insert member into operating position in the recess and then locking the insert member against angular displacement.

A preferred manner of carrying out my invention will be more particularly disclosed by way of example with reference to the accompanying drawings, in which.

Figure 1:
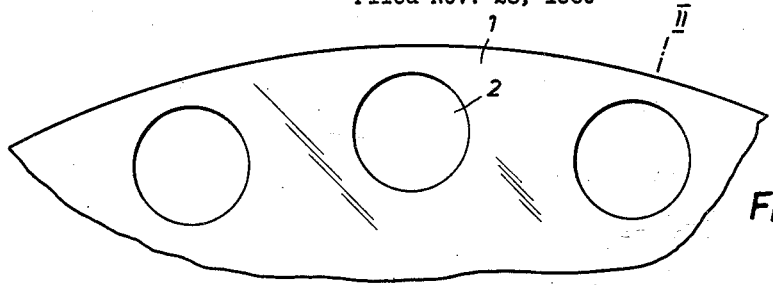
FIG. 1 is a plan view of a portion of a saw blade blank having a series of equally spaced holes drilled along the marginal portion of the blank.

In FIG. 1 a circular saw disc blank 1 of steel is provided with a series of holes 2 drilled into the disc at equal angular distances and along a common radius in proximity of the periphery of the disc.

Figure 2:
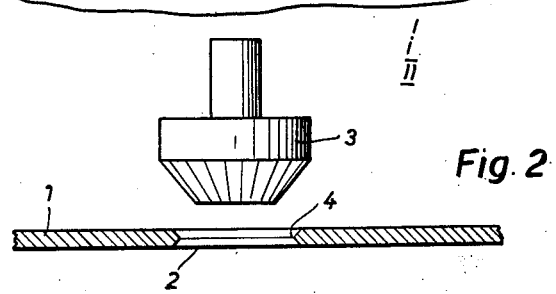
FIG. 2 is an enlarged transverse section on the line II—II of FIG. 1, showing the manner of providing the holes with a V-shape circumferential guide.

The holes 2 are counter-sunk from both sides by tool 3 so as to provide a circumferential V-shaped or wedge-shaped cylindrical guide surface 4 along the periphery of the hole. This operation is shown in FIG. 2.

Figure 3:
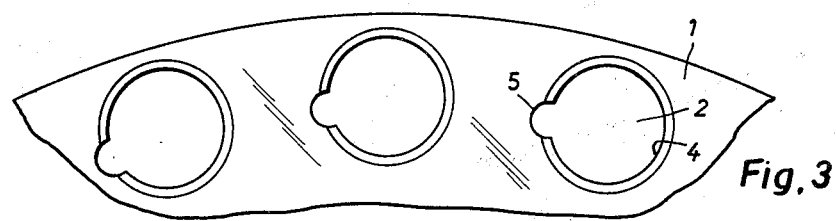
FIG. 3 is a plan view of the saw blade blank showing the further operating step of providing a bore on the periphery of each hole.

Afterwards, as shown in FIG. 3, the marginal portion of each hole 2 is provided with a recess 5 which is formed by a punching tool, the recess extending over one half of a circle.

The next step in the method is that of reducing the diameter of the saw disc blank for example, by a turning operation on a lathe whereby a marginal portion 6 is cut off, so that the holes 2 drilled in the blank are opened to such an amount that the circumference of the remaining portion of the holes 2 extends through an angle of more than 180°. After the turning operation a further portion 7 is cut away at the left of each hole 2 for example, by a shearing or milling operation, but the circumference of the hole 2 still extends over more than 180°.

Figure 4:
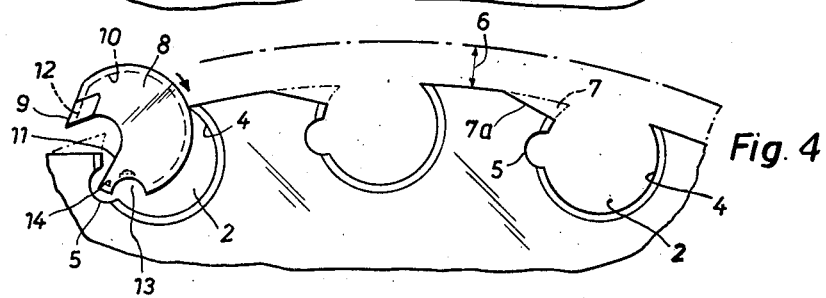
FIG. 4 shows the same portion of the saw blade after its diameter has been reduced so as to transform the circular holes into open marginal recesses, the circular circumference of the recesses extending through an angle of more than 180°.
Figure 5:
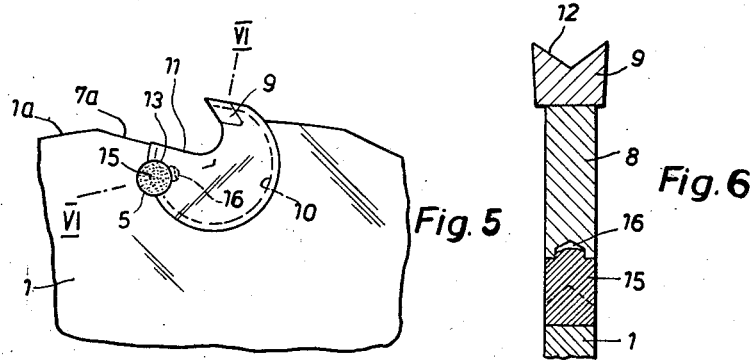
FIG. 5 is a fragmentary plan view of the circular saw disc showing an inserted tooth.
Figure 6:
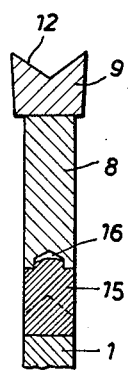
FIG. 6 is a sectional view along the line VI—VI of FIG. 5 drawn to a larger scale.

An insert member 8 supporting a saw tooth 9 is introduced in each hole 2 in the manner as is apparent from FIG. 4. The insert member 8 consists of a circular steel disc having its periphery formed with a V-shaped key groove 10 adapted to engage over the wedge-shaped guide 4 of the hole 2. The disc 8 has a portion cut away to form a recess 11. The saw tooth 9 of hard steel is secured for example, by hard solder to the disc 8. The tooth 9 is formed symmetrically with respect to the central plane of the disc and has its top provided with a V-shaped groove 12 forming an extension of the groove 10 of the disc 8. This tooth ensures a perfect guiding of the saw blade in the work piece. The disc 8 is provided with a circular arcuate recess 13 having the same radius as the recess 5 in the periphery of the hole 2 of the saw blade disc 1. When insert member 8 is inserted in the hole 2 of the saw blade, the two recesses 5 and 13 are brought to register and a cylindrical pin 14 is pressed into the opening so formed for locking the disc 8 in the hole 2.

The manner of inserting the disc 8 into the hole 2 is seen in FIG. 4. The disc 8 is brought into a position so that the appendix 14 formed between the recessed portion 11 and the small arcuate recess 13 enters into the arcuate recess 5 of the periphery of the hole 2. Then the disc 8 will be moved in the direction of the arrow to bring the V-shaped groove of the disc into engagement with the wedge-shaped guide 4 of the hole 2. The appendix 14 will then be clear of the recess 5 and the disc 8 can be turned until the recesses 5 and 13 register. A pin 15, of a relatively soft metal, for example aluminum, will then be pressed into the opening formed by the registering recesses. Preferably a small pocket 16 will be drilled in the wall of the recess 13 in the saw tooth carrying disc 8. The aluminum pin 15 will be made slightly longer than the thickness of the disc 8 and when it is inserted in the opening 5, 13 and subjected to pressure, the pin will be upset and a portion of the pin material will flow into the pocket 16 and constitute an effective lock preventing the pin from becoming loose and accidentally falling out of its locking position.

The described method of manufacturing a circular saw is particularly advantageous owing to the simplicity of the required machining steps. No milling operation is necessary for finishing the saw, only simple drilling and punching operations are required. The recessed portion 11 of the saw tooth disc 8 and the slope 7a in line therewith and joining the circular edge 1a of the blade 1 form an effective means permitting an easy removal of the chips cut by the tooth 9.

I claim:
1. A method for producing a circular saw comprising boring equidistantly spaced circular holes into the marginal portion of a saw blade blank of larger diameter than the finished saw blade, reducing the diameter of said blank to that of the finished blade such that said holes are transformed into recesses which are open at the periphery of the saw blade, inserting an insert member adapted for a cutting operation in each of the recesses of the saw blank, and then locking the insert member to the saw blank to prevent relative displacement therebetween.

2. A method as claimed in claim 1, wherein the diameter of said saw blade blank is reduced such that the circumference of said open recesses extends through an angle of more than 180°.

3. A method of producing circular saws having a saw blade and saw teeth carrying circular insert members engaged in recesses provided along the periphery of the blade, which method comprises drilling equidistantly spaced circular holes into the marginal portions of a saw blade blank of larger diameter than the finished blade, forming a circular arcuate recess in the periphery of each of said holes, reducing the diameter of said blank to that of the finished blade such that said holes are transformed into recesses which are open at the periphery of the saw blade, cutting a portion from the circular contour of each insert member to form a portion of reduced diameter, forming a circular arcuate recess in the periphery of each insert member, inserting each insert member in the radial direction into a corresponding one of the open recesses formed on the saw blade, rotating the insert member until said arcuate recess in the insert member registers with the arcuate recess in the periphery of said holes, and forcing a locking pin into said registering recesses to lock said insert and blank together to prevent relative displacement therebetween.

4. A method as claimed in claim 3, wherein said holes in the saw blade blank are countersunk from both sides of the blade to form a V-shaped guide along the circumference of each hole.

5. A method as claimed in claim 3 and comprising forming a pocket in the arcuate recess at the periphery of said insert member, and applying pressure to said locking pin after insertion into said registering recesses, whereby a portion of the material of said pin enters into said pocket to positively lock the pin in the registering recesses.

References Cited in the file of this patent

UNITED STATES PATENTS

| | | |
|---|---|---|
| 74,541 | Humphrey | Feb. 18, 1868 |
| 151,043 | Miller | May 19, 1874 |
| 272,319 | Prosser | Feb. 13, 1883 |
| 1,837,344 | Stauder | Dec. 22, 1931 |
| 2,830,474 | Brauchler | Apr. 15, 1958 |